Oct. 31, 1933.                L. EMANUELI                1,933,008
            MANUFACTURE OF ELECTRIC CABLES FOR HIGH TENSIONS
                          Filed June 23, 1931

Inventor
Luigi Emanueli,
By
Emil Bonnelycke
Attorney

Patented Oct. 31, 1933

1,933,008

UNITED STATES PATENT OFFICE 1,933,008

MANUFACTURE OF ELECTRIC CABLES FOR HIGH TENSIONS

Luigi Emanueli, Milan, Italy, assignor to Società Italiana Pirelli, Milan, Italy Application June 23, 1931, Serial No. 546,324, and in Italy July 25, 1930

5 Claims. (Cl. 173—268)

The present invention has for its object an improvement in the construction of cable ends for high and extra high tension cables. In these cable ends, with the lead sheath cut down to a certain distance from the end of the cable, there is a very uneven distribution of potential on the surface of the bared insulation; the gradient is maximum towards the end of the lead sheath and at this point, therefore, there is greater danger of burning. In order to avoid this inconvenience it has been the common practice to apply to the end of the lead sheath, and connected to it, a metallic surface of revolution, conveniently bell-shaped towards the cable end, which is filled wholly or in part with material having a high dielectric strength.

Also in the case in which the cable end has the insulation reconstituted by means of a winding of insulating paper or cloth which reaches a diameter greater than that used for the cable, the above-mentioned metallic surface can be used by conveniently moulding the front of the insulation towards the lead sheath so that the said surface can be applied in close contact. Said front of the insulation can also be covered with metallized paper which is connected to the lead sheath.

The present invention has for its object an arrangement which can give the same result in a much simpler manner. According to the present invention a metallic wire, for instance, of tinned copper or lead, is wound in a close and tight spiral or helix on the front of the insulation which is conveniently tapered towards the lead. The connection of the said wire with the lead sheath presents several difficulties, because corners and points between the metal and insulation must be absolutely avoided and the passage from the surface of the lead sheath to that of the spiral of the wire must be as gradual as possible.

Figure 1:
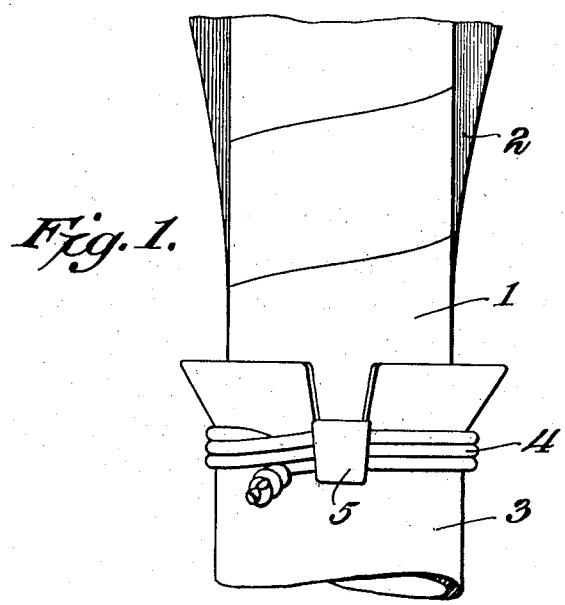
Figure 2:
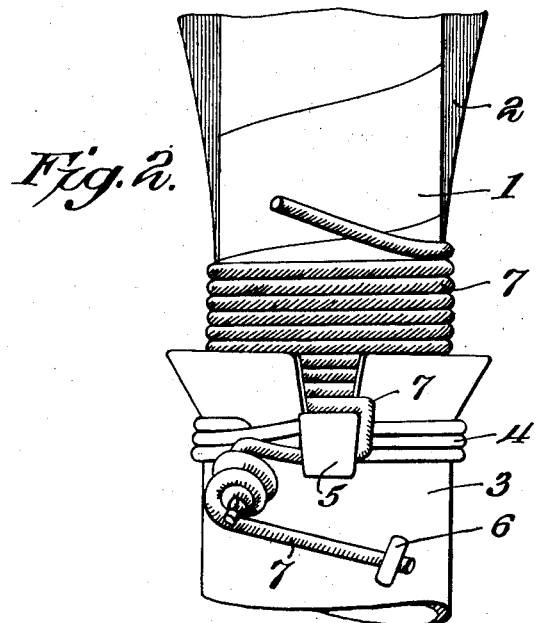

Figures 1 and 2 represent successive phases during the connecting operation according to the present invention.

In the drawing, 1 shows the original surface of the insulation, 2 the surface of the reconstructed insulation, tapered towards the lead sheath, and 3 the lead sheath. According to the present invention, in order to connect the metallic wire which must be wound over the insulation with the lead sheath, a binding 4 is first made on the lead sheath some centimeters from its edge by means of a few closely wound spirals of metallic wire. Two longitudinal, parallel slits, about 15 mm. apart, are then made on the lead from its edge to almost the binding. The strip of lead 5 so formed is lifted with a suitable ebonite chisel, then grasped with a pair of pincers and bent back. Introducing the same chisel carefully between the lead sheath and the insulation the whole of the lead end is raised all around, from its edge to the aforesaid binding, and is opened out in the form of a bell or trumpet, as shown in Figures 1 and 2. One end of a bare metallic strip or wire 7, which will serve to make the winding on the insulation, is then soldered at 6 to the lead sheath and then passed through the notch left by the bent over strip or tongue of lead mentioned above. If desired, the wire 7 may be wound around the outside of the sheath or may be fastened to the binding 4 and passed underneath the tongue 5, as shown. The winding on the insulation is then commenced, taking care that the turns are well pressed together and forcing the first turns—with a suitable ebonite hammer—as far as possible under the lead sheath, that is, between the lead sheath and the insulation. When this winding is finished, and the adjacent turns soldered together in a number of places, the belled end of the lead sheath is then hammered down so as to obtain a good contact between the inside surface of the lead sheath and the metallic wire binding.

This method can be used for every kind of joint, and particularly for the terminals and stop joints of cables of the oil-filled type.

I claim as my invention:—

1. A cable comprising a conducting core, an insulating layer, and a metallic sheath, the sheath having a notch, and a conducting strip secured to the outside of the sheath, passing through the notch, and wound around the insulating layer.

2. A cable as set forth in claim 1, wherein the portion of the sheath cut to provide the notch forms a tongue which is folded back on itself.

3. A cable as set forth in claim 1, comprising a binding on the outside of the cable sheath, the strip being fastened to the binding.

4. A cable as set forth in claim 1, wherein the strip is wound around the insulating material beneath the notched portion of the sheath, the latter being belled out from the insulating material to form a trumpet shape.

5. A cable as set forth in claim 1, wherein the portion of the sheath cut to provide the notch forms a tongue which is folded back on the outside of the sheath, the strip passing underneath said tongue.

LUIGI EMANUELI.